US008682135B2

United States Patent
Nomoto et al.

(10) Patent No.: US 8,682,135 B2
(45) Date of Patent: Mar. 25, 2014

(54) IMAGE REPRODUCTION APPARATUS

(75) Inventors: Manabu Nomoto, Hachioji (JP); Yasunori Tsukahara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 316 days.

(21) Appl. No.: 13/280,072

(22) Filed: Oct. 24, 2011

(65) Prior Publication Data

US 2012/0099834 A1    Apr. 26, 2012

(30) Foreign Application Priority Data

Oct. 22, 2010   (JP) ................................ P2010-237407

(51) Int. Cl.
*H04N 5/775*   (2006.01)
(52) U.S. Cl.
USPC ............................................. 386/230
(58) Field of Classification Search
None
See application file for complete search history.

(56) References Cited

U.S. PATENT DOCUMENTS

2005/0206801 A1* 9/2005 Miura ............................ 349/58

FOREIGN PATENT DOCUMENTS

| JP | H03-252790 A2 | 11/1991 | |
|---|---|---|---|
| JP | H04-076690 A2 | 3/1992 | |
| JP | 06079999 | * 9/1992 | .................... 40/200 |
| JP | 07-093436 | 4/1995 | |
| JP | H07-093436 A2 | 4/1995 | |
| JP | 2006-331551 | 12/2006 | |
| JP | 2008-199297 A2 | 8/2008 | |
| JP | 2010-107587 | 5/2010 | |
| JP | 2010-107587 A2 | 5/2010 | |
| JP | 2010-178215 | 12/2010 | |

OTHER PUBLICATIONS

Notification of Reasons for Refusal for Japanese Patent Application 2010-237407, dated Jan. 17, 2012.
Notification of Reasons for Refusal for Japanese Patent Application 2010-237407, dated Apr. 24, 2012.

* cited by examiner

*Primary Examiner* — William C Vaughn, Jr.
*Assistant Examiner* — Daniel Tekle
(74) *Attorney, Agent, or Firm* — Knobbe Martens Olson & Bear LLP

(57) ABSTRACT

According to one embodiment, an image reproduction apparatus includes: a display device configured to display an image represented by a video signal; and a reproduction module including an insertion port into which an optical disc is inserted, and configured to reproduce a video signal, wherein the display device and the reproduction module are provided in a same casing; and the display device is caused to display an image representing each of a position of the insertion port and the optical disc to be inserted into the insertion port based on an operation instruction to the reproduction module.

10 Claims, 6 Drawing Sheets

FIG. 5A
FIG. 5B
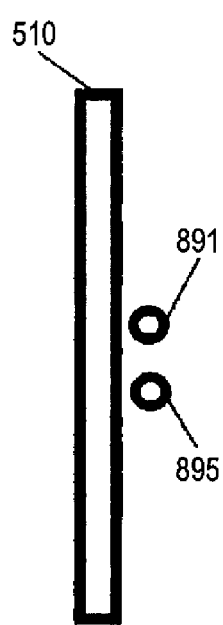
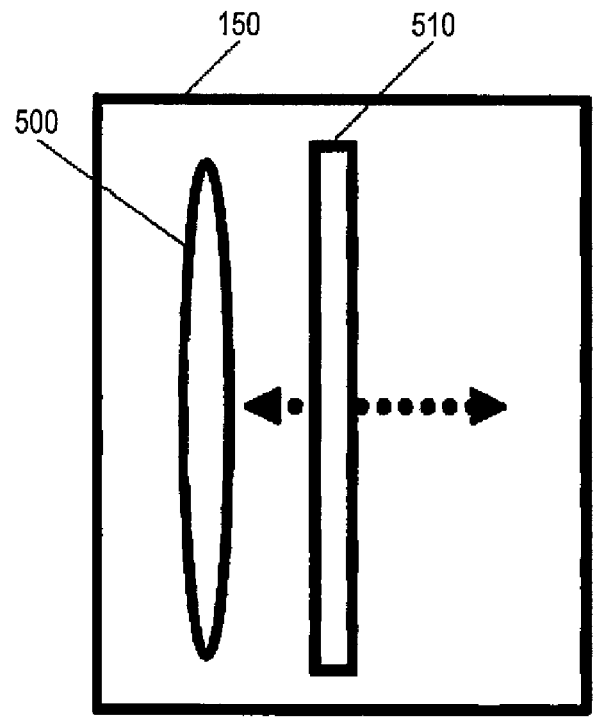

IMAGE REPRODUCTION APPARATUS

CROSS REFERENCE TO RELATED APPLICATION(S)

The application is based upon and claims the benefit of priority from Japanese Patent Application No. 2010-237407 filed on Oct. 22, 2010, the entire contents of which are incorporated herein by reference.

BACKGROUND

1. Field

Embodiments of the present invention relate to an image reproduction apparatus configured by providing to a display device (e.g., a liquid crystal display (LCD) device) an optical disc reproducing function of reproducing an optical disc such as a digital versatile disc (DVD) or a blu-ray disk (BD).

2. Description of the Related Art

An apparatus has been known, which has an external connection terminal (e.g., a universal serial bus (USB) port) at a place close to a display screen and displays an arrow on the display screen as an image visually indicating a relative position of the external connection terminal.

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

FIG. 5A is a diagram illustrating a configuration of a part of the image reproduction apparatus, and FIG. 5B is a diagram illustrating an example of the disk insertion screen display according to the embodiment.

DETAILED DESCRIPTION

Hereinafter, an embodiment of the invention is described with reference to the drawings.

Figure 1:
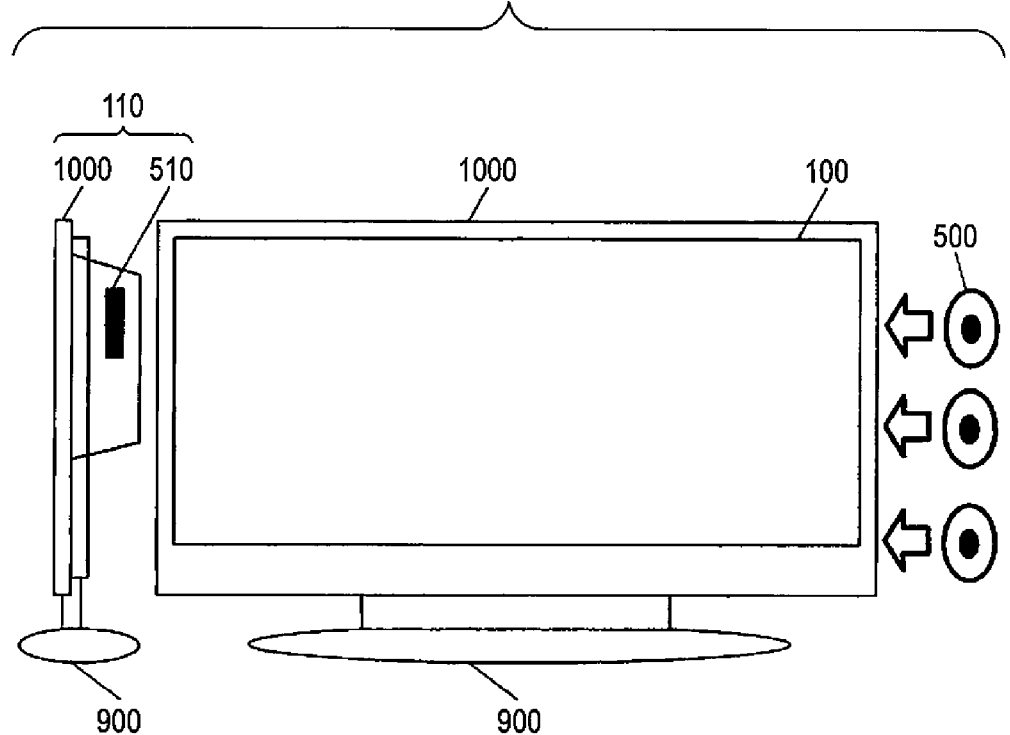
FIG. 1 is a schematic diagram illustrating an appearance of an image reproduction apparatus according to an embodiment of the invention.
Figure 2:
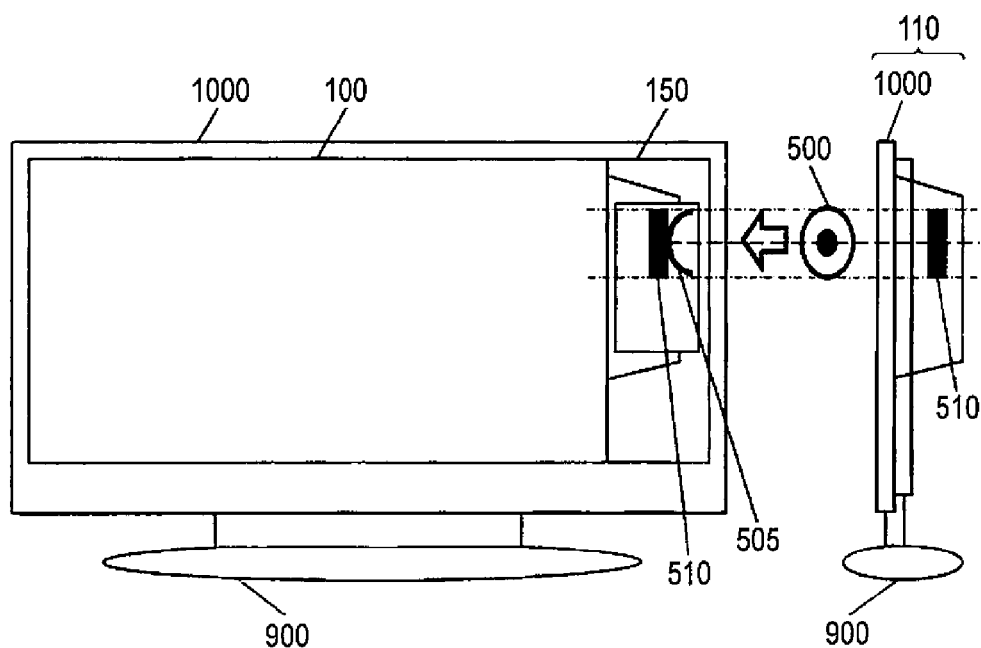
FIG. 2 is a schematic diagram illustrating a configuration of the image reproduction apparatus according to the embodiment, whose disc insertion screen is displayed.

FIGS. 1 and 2 are schematic diagrams illustrating the appearance of an image reproduction apparatus 1000 described in the present embodiment.

The image reproduction apparatus is assumed to be, e.g., an apparatus configured by providing, to a liquid crystal display (LCD) apparatus, an optical disc reproducing function of reproducing an optical disc such as a DVD disc or a BD disc. However, the image reproduction apparatus according to the invention is not limited thereto.

The LCD combo 1000 includes a screen 100, and a stand 900 provided under the screen 100 to support the entire LCD combo 1000 including the screen 100.

The LCD combo 1000 incorporates an optical disc drive 520 and has a disc insertion port 510 for allowing a user to insert an optical disc such as a DVD disc and a BD disc into an optical disk drive 520. According to an example illustrated in FIGS. 1 and 2, the disc insertion port 510 is formed in a right side of the LCD combo 1000.

As illustrated in FIG. 2, the difference between a conventional LCD combo and the LCD combo 1000 is that a disc insertion screen 150 of the LCD combo 1000 is provided in a part of the screen 100. The disc insertion screen 150 is assumed so that the display of a part of the screen 100 is changed at a predetermined timing. However, the disc insertion screen 150 can always be displayed, independent of the screen 100. Although the disc insertion screen 150 is displayed by changing a part of the display of the screen 100 in the present embodiment, the apparatus can be configured such that the transparent display of the disc insertion screen 150 is performed so that the image of the screen 100 under the disc insertion screen 150 is viewable by a user. Apparently, the apparatus can be configured such that the transparency of the disc insertion screen 150 is settable by a user.

Generally, the LCD combo 1000 is such that the disc insertion port 510 is formed in a side surface thereof, as illustrated in FIG. 1. Thus, a user cannot view the disc insertion port 510 directly from the front of the screen 100. Every time an optical disc 500 is inserted thereinto, the user needs moving round to the side of the LCD combo 1000 and then checking the disc insertion port 510. In the case of the LCD combo 1000 shown in FIG. 2, it is unnecessary that a user moves round to the side of the LCD combo and checks the disc insertion port 510, as described above. Accordingly, the convenience of the LCD combo is enhanced.

Because a user cannot directly see the disc insertion port 510, as described above, the user frequently insert the optical disc 500 into the disc insertion port 510 by relying on experience and intuition. This is unnecessary in the case of employing the LCD combo 1000 illustrated in FIG. 2.

Figure 3:
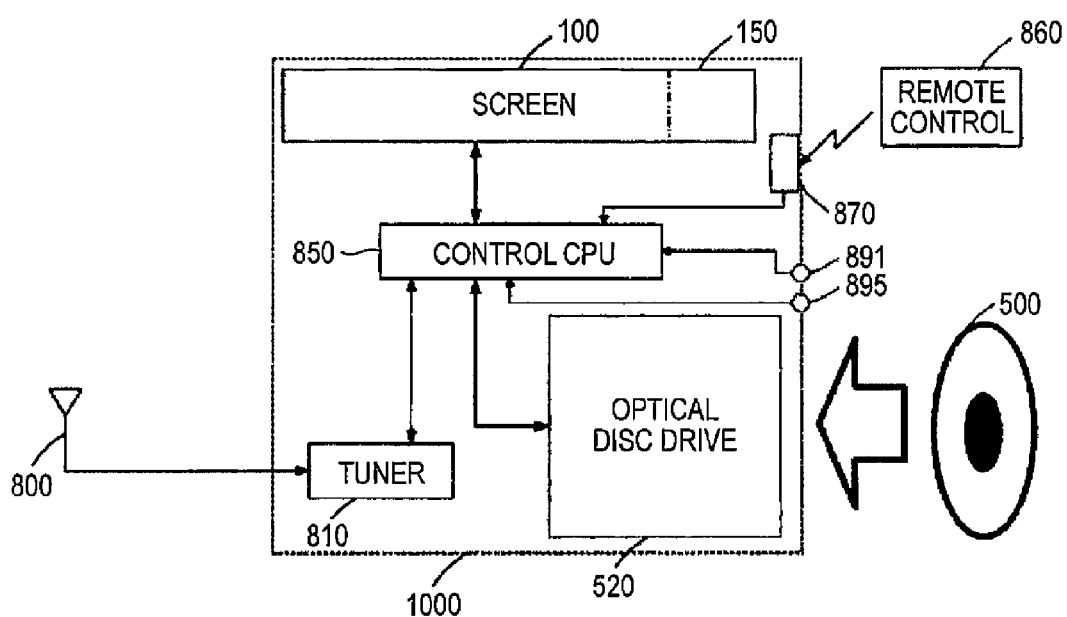
FIG. 3 is a block diagram illustrating the image reproduction apparatus according to the embodiment.

FIG. 3 is a schematic diagram illustrating a configuration of the LCD combo 1000 to be described in this embodiment. The LCD combo 1000 receives a broadcast signal (video signal) from an antenna 800 at a tuner 810, and displays an image represented by the received video signal on the screen 100, based on an instruction from a control central-processing-unit (CPU) 850.

Whether the image represented by the video signal is displayed on the LCD combo 1000 is controlled by the control CPU 850 which receives at a remote control signal receiving unit 870 a control signal according to a user's operation of a remote control 860 and which controls the entire LCD combo 1000.

When the user inserts the optical disc 500 into the disk insertion port 510, the optical disc drive 520 is activated. In addition, an image represented by video signals output from the optical disc drive 520 is displayed on the screen 100. When detecting the insertion of the optical disc 500, the control CPU 850 controls the LCD combo 1000 to automatically stop the supply of video signals from the tuner 810, and to display on the screen 100 an image represented by the video signals output from the optical disc drive 520. However, the control CPU 850 can control the LCD combo 1000 such that an image represented by the video signals supplied from the tuner 810 is displayed on the screen 100 as it is until receiving a switch signal from the remote control 860.

In addition, a camera lens 891 and a sensor 895 are provided in the vicinity of the disc insertion port 510. Video signals output from the above components and signals output from the sensor 895 are sent to the control CPU 850.

Figure 4:
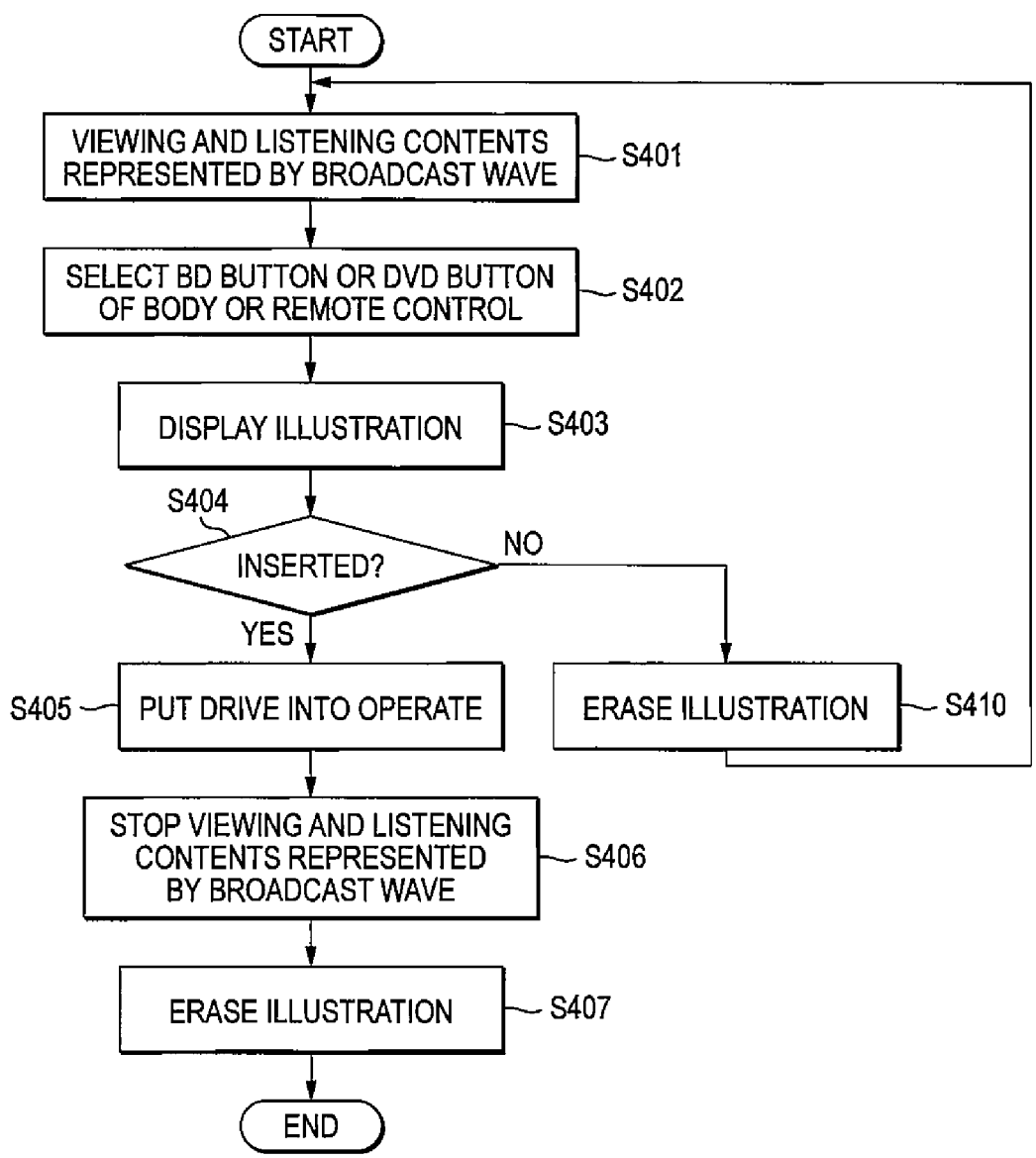
FIG. 4 is a flowchart illustrating a first process of displaying the disc insertion screen in the image reproduction apparatus according to the embodiment.

FIG. 4 is a flowchart illustrating a process performed when the optical disc 500 is inserted into the LCD combo 1000. Referring to FIG. 4, in step S401, a user views and listens contents represented by broadcast waves after the contents represented by the video signals (corresponding to the broadcast waves) sent from the tuner 810 are displayed on the screen 100. During that, the user pushes down a DVD button (not shown) or a BD button (not shown) of the LCD combo 1000 or the remote control 860. Consequently, in step S402, the control CPU 850 detects a signal output from the remote control 860, which corresponds to the DVD button or the BD button, via the remote control signal receiving unit 870. At that time, the control CPU 850 changes contents displayed on the entire screen 100 illustrated in FIG. 1, which are represented by the broadcast waves, to those displayed on the screen 100, which are illustrated in FIG. 2. That is, in step S403, (the illustration of) the disc insertion screen 150 is displayed on a part of the screen 100. The disc insertion port 510 provided in the right-side surface of the LCD combo 1000, as viewed in FIG. 2, and a part of the optical disc 500 are displayed on the disc insertion screen 150 with illustrations thereof including an illustration 505 of the optical disc such that the subsequent operation can easily be understood by the user. In order to facilitate the user to smoothly insert the optical disc 500 into the disc insertion port 510 of the LCD combo 1000, the illustration of the disc insertion port 510 displayed on the disk insertion screen 150 is shown such that the disk insertion screen 150 is substantially parallel to the longitudinal direction of the screen 100 and that the illustration 505 of the optical disc is substantially equal to the optical disc 500 in size.

In step S404, the control CPU 850 checks information sent from the optical disc drive 520, which represents whether the optical disc 500 is inserted into the optical disc drive 520. If the optical disc 500 is inserted thereinto (Yes in step S404), the optical disc drive 520 is caused to operate. Then, in step S405, the determination of the type of the optical disc, i.e., which of a DVD disc and a BD disc the optical disc is, the reproduction of the video signals recorded on the optical disc 500, and the like are performed. In step S406, the supply or output of a video signal from the tuner 810 is stopped to prevent an image represented by the video signal from being displayed on the screen 100.

Because the control CPU 850 confirms that the optical disc 500 is inserted into the optical disc drive 520, the user has been able to properly insert the optical disc 500 into the disc insertion port 510. Consequently, the video signals read from the optical disc 500 can be reproduced. Then, the supporting of the user's insertion of the optical disc 500 by displaying the disc insertion screen 150 is completed. Thus, in step S407, the display (see FIG. 2) of the disk insertion screen 150 is erased. Then, contents displayed on the screen 100 illustrated in FIG. 1 are returned to original contents displayed thereon.

If the optical disc 500 is not inserted thereinto (No in step S404), the control CPU 850 determines that although the user pushes down the DVD button (not shown) or the BD button (not shown) attached to the LCD combo 1000 or the remote control 860, the user stops inserting thereinto the optical disc (the DVD disc or the BD disc) 500. Then, the screen 100 including the disc insertion screen 150 illustrated in FIG. 2 is returned to those displayed on the original screen 100 illustrated in FIG. 1 (i.e., the contents represented by the broadcast waves, which are displayed on the entire screen 100). Thus, in step S410, the illustration of the disk insertion screen 150 illustrated in FIG. 2 is erased. The process returns to step S401.

FIG. 5A is a diagram illustrating positional relationship among a camera lens 891, a sensor 895 illustrated in FIG. 3 and the disc insertion port 510 of the LCD combo 1000. This example is provided with the camera lens 891 and the sensor 895 in the vicinity of the disc insertion portion 510, as illustrated in FIG. 5A.

Consequently, the sensor 895 can detect whether the optical disc 500 approaches the disk insertion port 510. In addition, it can be displayed using the camera lens 891 at what position the optical disc 500 is located with respect to the disk insertion port 510. FIG. 5B illustrates an example in which the disc insertion port 510 and the optical disc 500 are displayed on the disc insertion screen 150.

Figure 6:
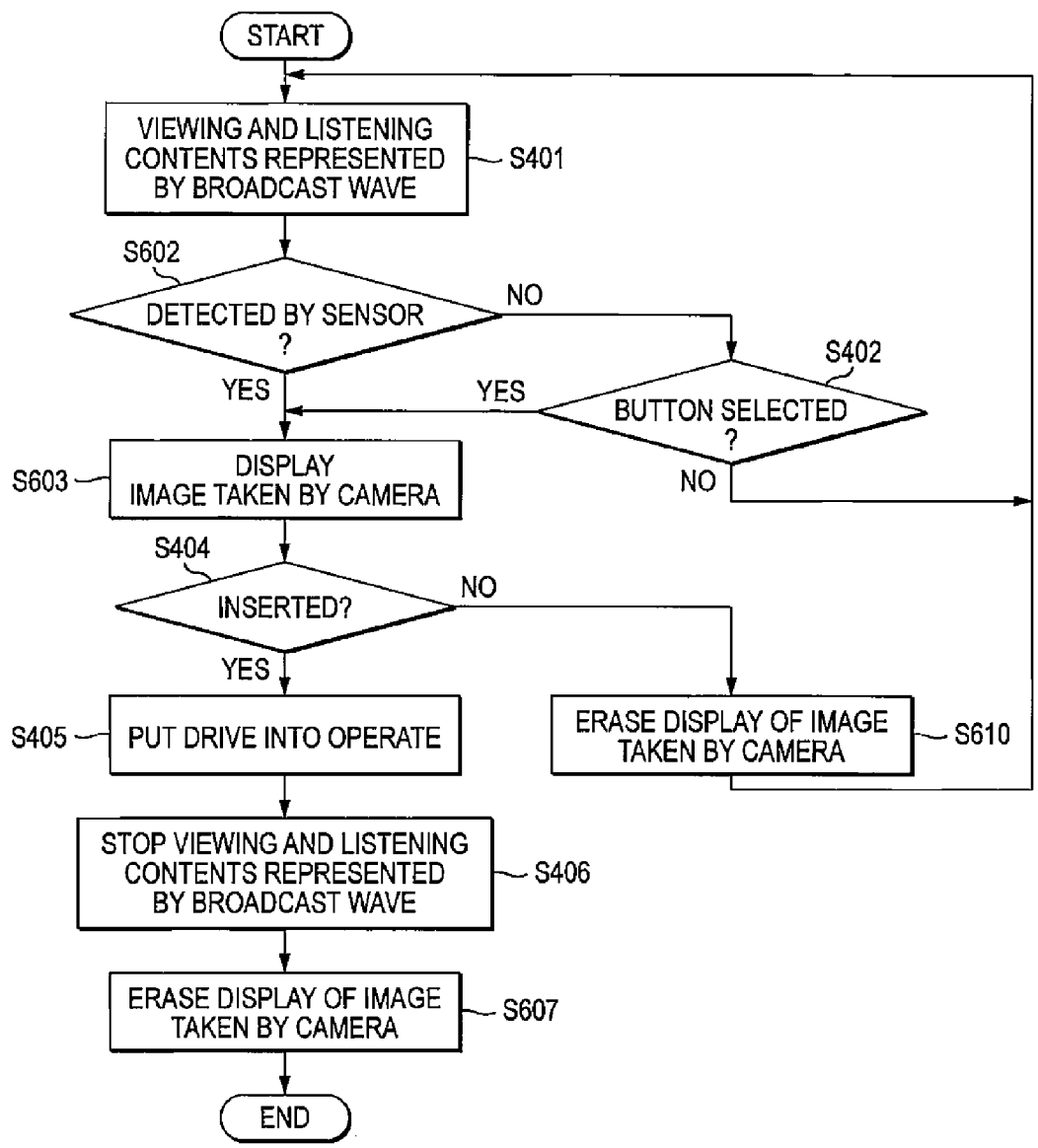
FIG. 6 is a flowchart illustrating a second process of displaying the disc insertion screen in the image reproduction apparatus according to the embodiment.

FIG. 6 is a flowchart illustrating a process in the case of inserting the optical disc 500 into the LC combo 1000 utilizing the camera lens 891 and the sensor 895.

Each operation in the process illustrated in FIG. 6, which is the same as that in the process illustrated in FIG. 4, is designated with the same reference numeral as that used to designate an associated operation in the process illustrated in FIG. 4. Thus, the description of such an operation is omitted. Referring to FIG. 6, in step S401, a user views and listens contents represented by the broadcast waves. During that, in step S602, the control CPU 850 appropriately checks signals output from the sensor 895. The sensor 895 is configured such that when an object (in this case, the optical disc 500 to be inserted into the disc insertion port 510 of the LCD combo 1000 is assumed to be the object) comes closer thereto, the sensor 895 outputs signals.

When receiving a signal from the sensor 895 (Yes in step S602), the control CPU 850 activates the camera lens 891 and causes the camera lens 891 to take an image of the vicinity of the disc insertion port 510. In addition, the screen 100 (contents represented by the broadcast waves are displayed in the entire screen 100) illustrated in FIG. 1 is changed to the screen 100 illustrated in FIG. 2. In step S603, an image (see, e.g., FIG. 5B) sent from the camera lens 891 on the disc insertion screen 150 is displayed in step S603.

If No in step S404, the control CPU 850 determines that the user stops inserting the optical disc 500 into the LCD component 1000. Thus, the control CPU 850 changes the screen 100 including the disc insertion screen 150 illustrated in FIG. 2 to the screen 100 (the contents represented by the broadcast waves are displayed on the entire screen 100) illustrated in FIG. 1. Thus, in step S610, the disc insertion screen 150 (on which an image sent from the camera is displayed) is erased illustrated in FIG. 2. Consequently, the process returns to step S401. When the optical disc 500 is inserted into the optical disc drive 520, in step S607, the disc insertion screen 150 (on which the image sent from the camera is displayed) is erased.

If No in step S602, in step S402, the control CPU 850 checks a signal sent from the remote control 860 corresponding to the DVD button or the BD button through the remote control signal receiving unit 870, similarly to step S402 illustrated in FIG. 4. If the DVD button or the BD button (not shown) attached to the LCD combo 1000 or the remote control 860 is pushed down (Yes in step S402), in step S603, the control CPU 850 can cause the image sent from the camera lens 891 to be displayed.

Accordingly, an image sent from the camera lens 891 is prevented from being displayed due to false recognition by the sensor 895 (e.g., when the user applies his hand over his body in order to touch the back surface of the LCD combo 1000) the vicinity of the disc insertion port 510.

While certain embodiments have been described, these embodiments have been presented by way of example only, and are not intended to limit the scope of the inventions.

Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image reproduction apparatus comprising:
   a display device configured to display an image represented by a video signal; and
   a reproduction module comprising an insertion port configured to receive an optical disc, the reproduction module configured to reproduce the video signal, wherein
   the display device and the reproduction module are provided in a common casing; and
   the display device is configured to display an image representing each of a position of the insertion port, and a position of the optical disc, based on an operation instruction received at the reproduction module.

2. The image reproduction apparatus according to claim 1, wherein the display device is further configured to display the image representing each of a position of the insertion port and the position of the optical disc, on a portion of the display device.

3. The image reproduction apparatus according to claim 1, wherein the display device is configured to display the image representing each of the position of the insertion port and the position of the optical disc at a position substantially parallel to the insertion port in a longitudinal direction of the display device.

4. The image reproduction apparatus according to claim 1, wherein the display device is configured to display the image representing each of a position of the insertion port and the position of the optical disc at a size which is substantially the same as that of the optical disc.

5. The image reproduction apparatus according to claim 1, wherein the display device is configured to display the image representing each of a position of the insertion port and the position of the optical disc transparently with respect to display of an image represented by the video signal.

6. The video reproduction apparatus according to claim 1, further comprising:
   a camera sufficiently near the insertion port to record an image of the optical disc when inserted into the insertion port,
   wherein the image representing each of the position of the insertion port, and the position of the optical disc, comprises an image recorded by the camera, and displayed on the display device.

7. An image reproduction apparatus comprising:
   a display device configured to display an image represented by a video signal;
   a reproduction module comprising an insertion port configured to receive an optical disc, the reproduction module configured to reproduce the video signal; and
   a detection module configured to detect whether an object approaching the insertion port is present, wherein:
   the display device and the reproduction module are provided in a common casing; and
   the display device is configured to display an image of a periphery of the insertion port based on a result of detection by the detection module.

8. The image reproduction apparatus according to claim 7, wherein the display device is configured to display the image of a periphery of the insertion port on a portion of the display device.

9. The image reproduction apparatus according to claim 7, wherein the display device is configured to display the image of a periphery of the insertion port at a position substantially parallel to the insertion port in a longitudinal direction of the display device.

10. The image reproduction apparatus according to claim 7, wherein the display device is configured to display the image of a periphery of the insertion port at a size which is substantially the same as that of the optical disc.

* * * * *